(12) United States Patent
Chen

(10) Patent No.: US 8,285,921 B2
(45) Date of Patent: *Oct. 9, 2012

(54) CONFIGURABLE FLASH MEMORY CONTROLLER AND METHOD OF USE

(75) Inventor: Ben Wei Chen, Fremont, CA (US)

(73) Assignee: Kingston Technology Corporation, Fountain Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/824,557

(22) Filed: Jun. 28, 2010

(65) Prior Publication Data

US 2010/0262768 A1    Oct. 14, 2010

Related U.S. Application Data

(63) Continuation of application No. 11/060,649, filed on Feb. 16, 2005, now Pat. No. 7,757,037.

(51) Int. Cl.
G06F 12/00 (2006.01)
G06F 13/00 (2006.01)
G06F 13/28 (2006.01)

(52) U.S. Cl. ...................................................... 711/103
(58) Field of Classification Search .................. None
See application file for complete search history.

(56) References Cited

U.S. PATENT DOCUMENTS

| 4,625,081 A * | 11/1986 | Lotito et al. ............... 379/88.26 |
| 5,295,255 A | 3/1994 | Malecek et al. |
| 5,596,738 A * | 1/1997 | Pope ............................ 711/103 |
| 5,606,660 A | 2/1997 | Estakhri et al. |
| 5,630,099 A | 5/1997 | MacDonald et al. |
| 5,752,066 A | 5/1998 | Bealkowski et al. |
| 5,778,245 A | 7/1998 | Papworth et al. |
| 5,799,168 A * | 8/1998 | Ban ............................... 711/103 |
| 5,970,240 A | 10/1999 | Chen et al. |
| 6,148,354 A | 11/2000 | Ban et al. |
| 6,327,639 B1 | 12/2001 | Asnaashari |

(Continued)

FOREIGN PATENT DOCUMENTS

WO    WO 9938066 A1 *  7/1999

OTHER PUBLICATIONS

Babb et al., "Virtual Wires: Overcoming Pin Limitations in FPGA-based Logic Emulators", 1993, IEEE, pp. 142-151.

(Continued)

Primary Examiner — Edward Dudek, Jr.
Assistant Examiner — Matthew Chrzanowski
(74) Attorney, Agent, or Firm — Sawyer Law Group, P.C.

(57) ABSTRACT

A FLASH memory controller is disclosed. The controller comprises a microcontroller. The microcontroller including firmware for providing different mappings for different types of FLASH memory chips. The controller also includes FLASH control logic for communicating with the microcontroller and adapted to communicate via a FLASH data bus to at least one FLASH memory chip. The FLASH control logic including mapping logic for configuring the FLASH data bus based upon the type of FLASH memory chip coupled thereto. A method and system in accordance with the present invention provides the following advantages: Configurable data bus on the FLASH memory controller through software to simplify routing complexity. Configurable chip select and control bus for flexibility of FLASH memory placement. Elimination of external resistor network for layout simplicity. A scalable architecture for higher data bus bandwidth support. Auto-detection of FLASH memory type and capacity configuration.

11 Claims, 11 Drawing Sheets

U.S. PATENT DOCUMENTS

| | | |
|---|---|---|
| 6,397,314 B1 | 5/2002 | Estakhri et al. |
| 6,513,094 B1 | 1/2003 | Magro |
| 6,523,132 B1 | 2/2003 | Harari et al. |
| 6,628,537 B1 | 9/2003 | Wallace et al. |
| 6,711,059 B2 | 3/2004 | Sinclair et al. |
| 6,742,058 B2 * | 5/2004 | Jahnke et al. .................. 710/14 |
| 6,763,480 B2 | 7/2004 | Harari et al. |
| 6,801,979 B1 | 10/2004 | Estakhri |
| 6,807,106 B2 | 10/2004 | Gonzales et al. |
| 7,162,549 B2 | 1/2007 | Mambakkam et al. |
| 2002/0103995 A1 | 8/2002 | Owen et al. |
| 2002/0147898 A1 | 10/2002 | Rentschler et al. |
| 2005/0160218 A1 * | 7/2005 | See et al. ...................... 711/103 |
| 2006/0069896 A1 | 3/2006 | Sanders |

OTHER PUBLICATIONS

Synopsys Data Sheet "DesignWare Memory Controller MacroCell", 2003, Synopsys, pp. 1-3.

* cited by examiner

CONFIGURABLE FLASH MEMORY CONTROLLER AND METHOD OF USE

CROSS-REFERENCE

Under 35 U.S.C. 120, this application is a continuation application and claims priority to U.S. application Ser. No. 11/060,649 filed on Feb. 16, 2005, entitled Configurable Flash Memory Controller and Method of Use, all of which is incorporated herein by reference.

FIELD OF THE INVENTION

The present invention relates generally to FLASH memory controllers and more particularly to a system and method for configuring a FLASH memory controller for different types of FLASH memory chips.

BACKGROUND

FLASH memory is generally used on a digital media storage product such as Secure Digital (SD), USB drive, Compact FLASH (CF), MultiMediaCard (MMC), Memory Stick (MS), Smart Media (SM) and others. A FLASH memory controller interfaces with various FLASH memory chips to construct one of the above mentioned digital media storage products. Conventional FLASH memory chips include an 8-bit data bus. A 16 bit FLASH memory chip has the same footprint as that of 8 bit FLASH memory chip. The 16 bit FLASH memory chips usually have the same pin assignment on electrical signals such as chip enable, ready, and control bus. However, the pin assignment for the data bus is generally very different between 8-bit and 16-bit FLASH memory. A conventional 16-bit FLASH memory controller is designed to interface with both 8-bit and 16-bit FLASH memory chips. The FLASH memory configuration on a digital media storage has the following four modes:

1. Single 8-bit access
2. Dual 8-bit parallel access
3. Single 16-bit access
4. Dual 16-bit interleave access Mode 4, dual 16-bit interleave access, has the best performance, while Mode 1, single 8-bit access, has the lowest performance. Mode 3, single 16-bit access, and mode 2, dual 8-bit parallel access, have a performance rating in between.

Due to data bus pin-out difference between 8-bit and 16-bit flash memory chips, conventionally it requires two different printed circuit boards (PCB) to support the four modes above.

One possible mapping of pins 10 between 8-bit and 16-bit FLASH memory chip is shown in FIG. 1. AHD0 through AHD15 are 16 bits data bus pins of 16-bit FLASH memory chip 12. AD0 through AD7 are 8 bits data bus pins of 8-bit FLASH memory chip 14. NC26, NC27, NC28, NC33, NC40, NC45, NC46, and NC47 are 8 non-connect pins of 8-bit FLASH memory chip 14 mapping to 16-bit FLASH memory chip 12. The term CS- refers to Chip Select, and the term BUSY- refers to Chip Busy. Other FLASH control bus pins are also included.

The conventional FLASH memory chip 14 has an 8-bit data bus (AD) along with chip select (CS-), busy (BUSY-) and other control signals. A 16-bit FLASH memory chip 12 may reside in the same package as that of an 8-bit FLASH memory chip. These two kinds of FLASH memory chips 12 and 14 have the same pin designation for chip select (CS-), busy (BUSY-) and other control signals, except for data bus signals (AD & AHD). One of pin mapping examples 10 of 8-bit FLASH memory chip 14 and 16-bit FLASH memory chip 12 is shown in FIG. 1. Note that data bus pins (AD0-AD7) of 8-bit flash memory 14 are not mapped one-to-one to the lower eight bits data bus (AHD0-AHD7) of 16-bit FLASH memory chip 12. In fact, AD0 through AD7 are mapped to AHD9, 2, 10, 3, 12, 5, 13 and 6 respectively. AHD8, 0, 1, 11, 4, 7, 14 and 15 of 16-bit FLASH memory chip are mapped to the no-connect (NC) pins of 8-bit counter part.

A 16-bit micro-controller (not shown) interfaces through its read/write control signals and data bus UD to a 16-bit FLASH Control Logic with FLASH data bus FD. The FD bus in turn interfaces with one or more 8-bit or 16-bit FLASH memory chips. Due to pin-out difference between 8-bit and 16-bit FLASH memory chip, conventionally it requires two different circuitries or printed circuit boards (PCBs) for these two different kinds of FLASH memory.

FIG. 2 is a block diagram of a circuit 100 for a conventional 16-bit FLASH memory controller 102 to support a single 8-bit access (Access mode 1) 108a or two 8-bit parallel access (Access mode 2) flash memory chips 108a and 108b.

As in FIG. 1, a FLASH memory controller 102 includes a micro controller 104, host interface 110, a ROM 122, a RAM 124, an internal data bus (UD0-UD15) 112, read/write control 114 and FLASH Control Logic 116. FLASH Control Logic 116 includes an internal data bus (UD0-UD15) 112, a FLASH chip select (FCS0-FCS3), a FLASH control bus (Fcontrol Bus) 118, a FLASH status bus (FBUSY0-FBUSY3) and a FLASH data bus (FD0-FD15).

In the case of single 8-bit access, data bus FD8 through FD15 120 is not connected. In the case of two 8-bit parallel access, control buses are connected together to the FLASH memory controller 102. Two 8-bit parallel access mode generally runs twice as fast as single 8-bit access mode because the access bandwidth is twice the size.

FIG. 3 is a diagram for a conventional 16-bit FLASH memory controller 202 to support a single 16-bit access 208a or two 16-bit interleave access FLASH memory chips 208a and 208b. 16-bit access generates the same performance as that of two 8-bit parallel access, while 16-bit interleave access has the best performance among the four access modes.

In order to have the same 16-bit FLASH memory controller support all four modes of access on the same printed circuit board (PCB), a different routing is required from the high order flash memory controller data bus FD8 through FD15 220 to 8-bit and 16-bit FLASH memory chips 208a and 208b, as shown in FIG. 2 and FIG. 3. Referring now to FIG. 4, conventionally the routing and mapping is done by adding four sets of resistor networks RA, RHA, RB and RHB between FLASH memory controller and 8/16-bit flash memory chips, as shown in FIG. 4.

FIG. 4 is a diagram of a circuit 300 for a conventional 16-bit FLASH memory controller 302 to support a single 8-bit access 308a or two 8-bit parallel access 308a and 308b or a single 16-bit access 308a or two 16-bit interleave access FLASH memory chips 308a and 308b on the same PCB. Four sets of resistor networks 310a-310b, and 312a-312b are utilized to select different modes of operation. Table 1 shows the four possible combinations:

TABLE 1

| Access | | Resistor Network | | | |
|---|---|---|---|---|---|
| Mode | Description | RA | RHA | RB | RHB |
| 1 | Single 8-bit access | Installed | | | |
| 2 | Dual 8-bit parallel access | Installed | | Installed | |
| 3 | Single 16-bit access | | Installed | | |
| 4 | Dual 16-bit interleave access | | Installed | | Installed |

One of the possible mappings of pin-outs is shown below:

TABLE 2

| FLASH memory controller FD | Resistor Network | FLASH Chip A Pinout | 8-bit FLASH Chip A AD | Mapped to AHD | Resistor Network | FLASH Chip A Pinout | 16-bit FLASH Chip A AHD | Resistor Network | FLASH Chip B Pinout | 8-bit FLASH Chip B BD | Mapped to BHD | Resistor Network | FLASH Chip B Pinout | 16-bit FLASH Chip B BHD |
|---|---|---|---|---|---|---|---|---|---|---|---|---|---|---|
| 0 | RA0 | 29 | 0 | 9 | RHA0 | 26 | 0 | | | | | RHB0 | 26 | 0 |
| 1 | RA1 | 30 | 1 | 2 | RHA1 | 28 | 1 | | | | | RHB1 | 28 | 1 |
| 2 | RA2 | 31 | 2 | 10 | RHA2 | 30 | 2 | | | | | RHB2 | 30 | 2 |
| 3 | Wired | 32 | 3 | 3 | Wired | 32 | 3 | | | | | RHB3 | 32 | 3 |
| 4 | RA4 | 41 | 4 | 12 | RHA4 | 40 | 4 | | | | | RHB4 | 40 | 4 |
| 5 | Wired | 42 | 5 | 5 | Wired | 42 | 5 | | | | | RHB5 | 42 | 5 |
| 6 | RA6 | 43 | 6 | 13 | RHA6 | 44 | 6 | | | | | RHB6 | 44 | 6 |
| 7 | RA7 | 44 | 7 | 6 | RHA7 | 46 | 7 | | | | | RHB7 | 46 | 7 |
| 8 | | | | | Wired | 27 | 8 | RB8 | 29 | 0 | 9 | RHB8 | 27 | 8 |
| 9 | | | | | RHA9 | 29 | 9 | RB9 | 30 | 1 | 2 | RHB9 | 29 | 9 |
| 10 | | | | | RHA10 | 31 | 10 | wired | 31 | 2 | 10 | wired | 31 | 10 |
| 11 | | | | | Wired | 33 | 11 | RB11 | 32 | 3 | 3 | RHB11 | 33 | 11 |
| 12 | | | | | RHA12 | 41 | 12 | wired | 41 | 4 | 12 | wired | 41 | 12 |
| 13 | | | | | RHA13 | 43 | 13 | RB13 | 42 | 5 | 5 | RHB13 | 43 | 13 |
| 14 | | | | | Wired | 45 | 14 | RB14 | 43 | 6 | 13 | RHB14 | 45 | 14 |
| 15 | | | | | Wired | 47 | 15 | RB15 | 44 | 7 | 6 | RHB15 | 47 | 15 |

UD0 through UD15, not shown, are 16 corresponding logical data bus bits from the micro-controller. FD0 through FD15 are 16 corresponding logical data bus bits from the FLASH memory controller. UD and FD data bus are wired through.

AD0 through AD7 are 8 corresponding logical data bus bits from 8-bit FLASH chip A 308a. AHD0 through AHD15 are 16 corresponding logical data bus bits from 16-bit FLASH chip A 308a. BD0 through BD7 are 8 corresponding logical data bus bits from 8-bit FLASH chip B 308b. BHD0 through BHD15 are 16 corresponding logical data bus bits from 16-bit FLASH chip B 308b.

"Wired" means no resistor network required. The connection is wired directly. Resistor networks RA 310a and RHA 310b are exclusive. Resistor network RA 310a is installed when an 8-bit FLASH chip is in use. Resistor network RHA 310b is installed when a 16-bit FLASH is in use. Resistor networks RB 312a and RHB 312b are exclusive. Resistor network RB 312a is installed when an 8-bit FLASH chip is in use. Resistor network RHB 312b is installed when a 16-bit FLASH is in use.

In order to be able to support both types of FLASH memory chips, it is required that both logic circuitries be combined together. Resistor networks RA 310a and RHA 310b are exclusive pairs serving as selector to select either 8-bit or 16-bit FLASH memory chips at physical location A 308a. Resistor networks RB 312a and RHB 312b are exclusive pairs serving as selector to select either 8-bit or 16-bit FLASH memory chips at physical location B 308b. There are a total of 96 signal traces in this circuit 300 that create great routing complexity in PCB layout. The mapping implementation is shown in Table 2. The corresponding logic equations are shown in Listing 1.

Listing 1

Logic equations of the mapping: (* is logical AND operator. + is logical OR operator)

FD0=(RA0*AHD9+RHA0*AHD0)+RHB0*BHD0

FD1=(RA1*AHD2+RHA1*AHD1)+RHB1*BHD1

FD2=(RA2*AHD10+RHA2*AHD2)+RHB2*BHD2

FD3=AHD3+RHB3*BHD3

FD4=(RA4*AHD12+RHA4*AHD4)+RHB4*BHD4

FD5=AHD5+RHB5*BHD5

FD6=(RA6*AHD13+RHA6*AHD6)+RHB6*BHD6

FD7=(RA7*AHD6+RHA7*AHD7)+RHB7*BHD7

FD8=AHD8+(RB8*BHD9+RHB8*BHD8)

FD9=RHA9*AHD9+(RB9*BHD2+RHB9*BHD9)

FD10=RHA10*AHD10+BHD10

FD11=AHD11+(RB11*BHD3+RHB11*BHD11)

FD12=RHA12*AHD12+BHD12

FD13=RHA13*AHD13+(RB13*BHD5+RHB13*BHD13)

FD14=AHD14+(RB14*BHD13+RHB14*BHD14)

FD15=AHD15+(RB15*BHD6+RHB15*BHD15)

As is shown in FIG. 4, there are 48 signal traces on both sides of resistor network RA, RHA, RB and RHB. A total of 96 traces are required to connect between FLASH memory controller and flash memory chips. Routing complexity makes it almost impossible to consider laying out support of both 8-bit and 16-bit FLASH memory chips with 16-bit FLASH memory controller.

Furthermore, different FLASH technology may have different FLASH memory data bus assignment due to package efficiency consideration. It is desirable to have a FLASH memory controller with flexible and field configurable architecture to accommodate present and future FLASH memory variations.

As FLASH memory technology becomes more mature, demand for higher performance becomes more imminent. One natural approach to improve the performance is to increase data bus bandwidth either on the FLASH memory controller side or on the FLASH memory side. It is no wonder that FLASH memory controller will expand its data bus bandwidth from 8-bit and 16-bit to 32-bit and beyond in the near future. FLASH memory chip may as well take the same expansion route for wider bandwidth. As the bandwidth increases, conventional way of adding more resistor networks to support all sizes of FLASH memory chips becomes more cumbersome.

It is desirable to provide a FLASH memory controller system to accommodate the following objectives:
Supporting 8-bit and 16-bit FLASH memory chips on the same PCB
Supporting all four FLASH memory access modes
Supporting all possible FLASH memory configurations
Improving layout routing complexity on PCB
Auto-detection and configuration of FLASH memory controller data bus
Able to scale up the controller data bus bandwidth for higher performance The present invention addresses such a need.

SUMMARY OF THE INVENTION

A FLASH memory controller is disclosed. The controller comprises a microcontroller. The microcontroller including firmware for providing different mappings for different types of FLASH memory chips. The controller also includes FLASH control logic for communicating with the microcontroller and adapted to communicate via a FLASH data bus to at least one FLASH memory chip. The FLASH control logic including mapping logic for configuring the FLASH data bus based upon the type of FLASH memory chip coupled thereto.

A method and system in accordance with the present invention provides the following advantages:

Configurable data bus on the FLASH memory controller through software to simplify routing complexity. Configurable chip select and control bus for flexibility of FLASH memory placement. Elimination of external resistor network for layout simplicity. A scalable architecture for higher data bus bandwidth support. Auto-detection of FLASH memory type and capacity configuration.

DETAILED DESCRIPTION

The present invention relates generally to flash memory controllers and more particularly to a system and method for configuring a flash memory controller for different types of flash memory chips.

The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Figure 1:
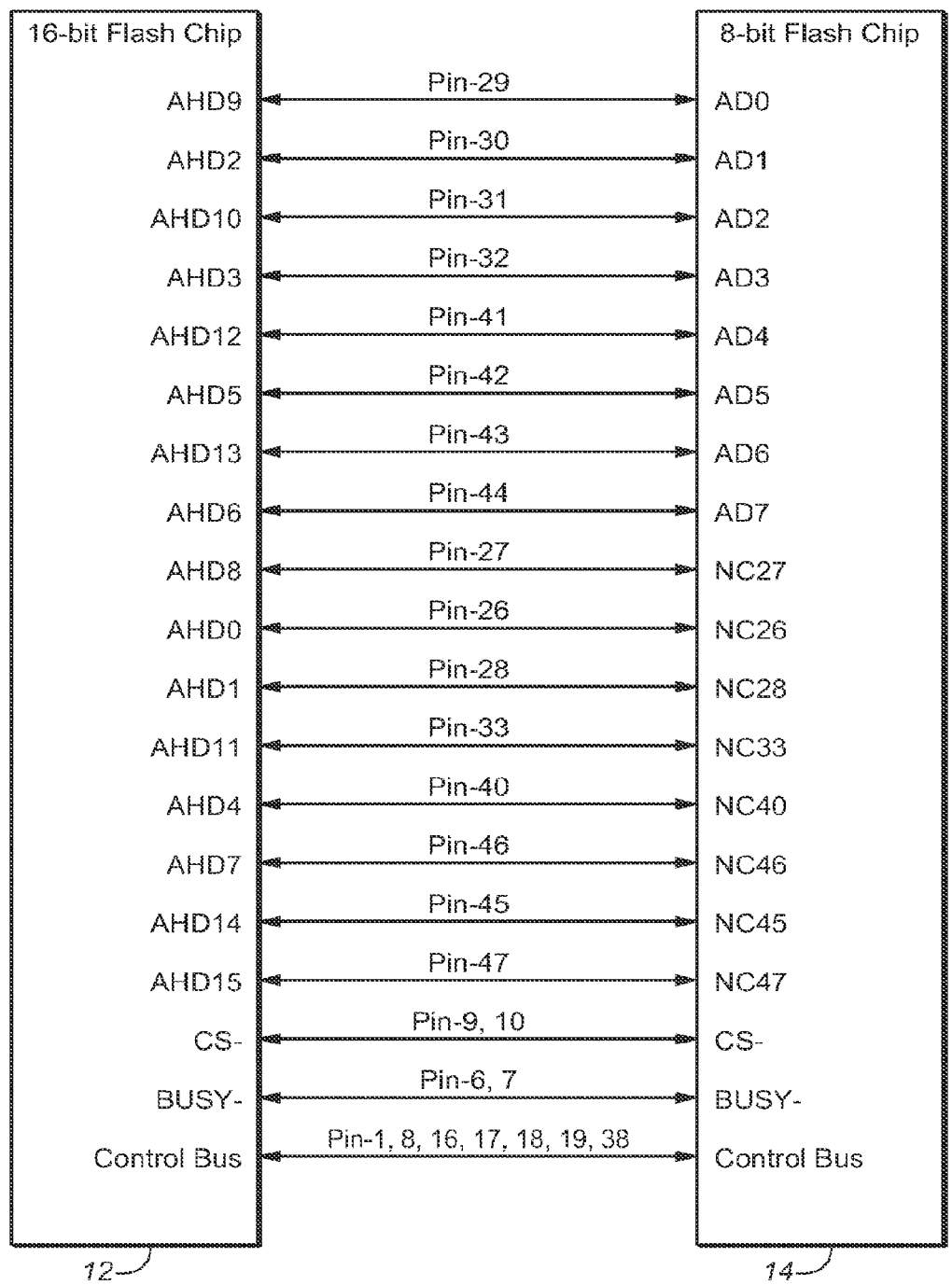
FIG. 1 is one possible mapping of pins between 8-bit and 16-bit FLASH memory chip sharing the same footprint and package.
Figure 2:
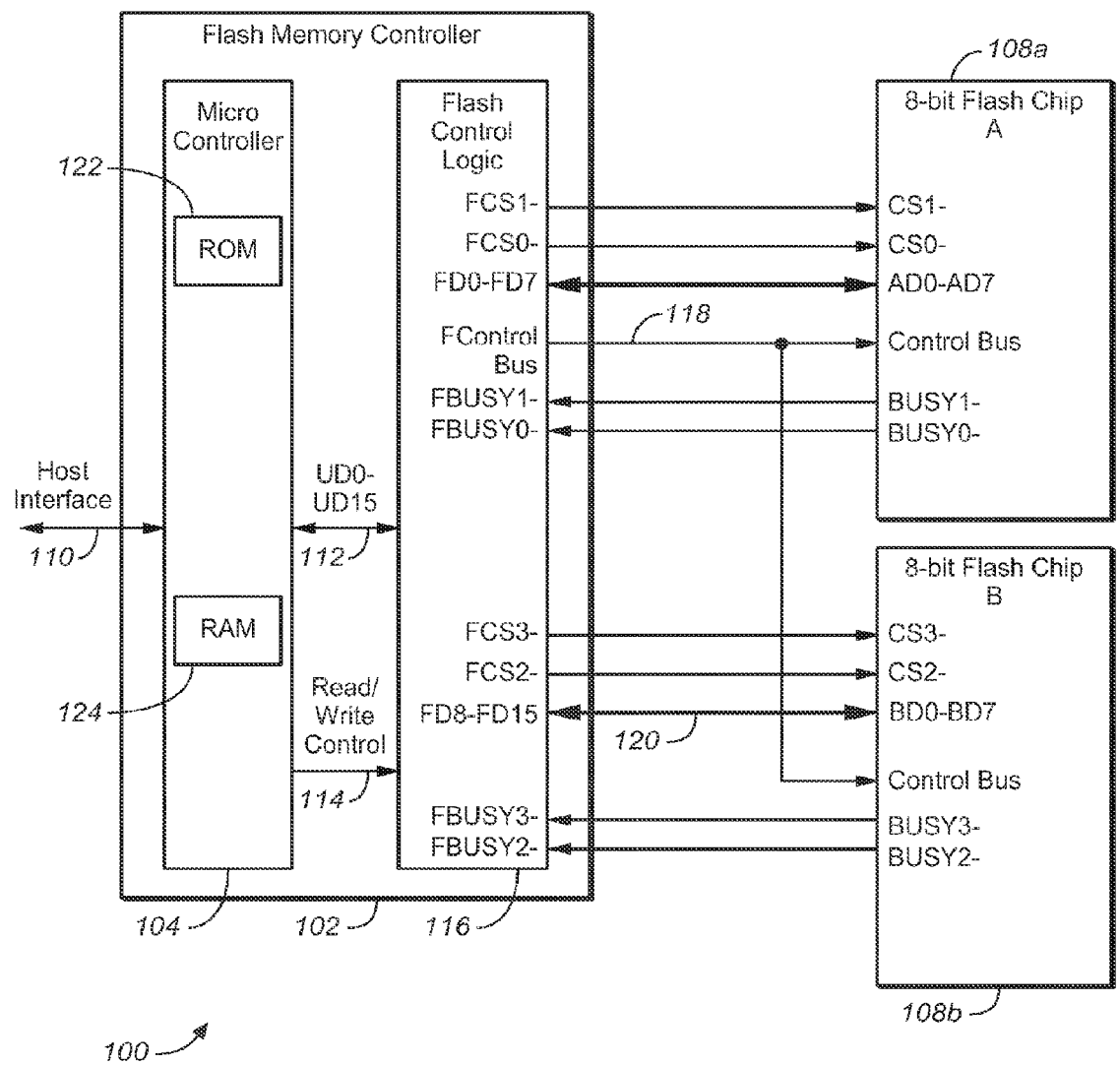
FIG. 2 is a circuit block diagram for a conventional 16-bit FLASH memory controller to support a single 8-bit access or two 8-bit parallel access FLASH memory chips.
Figure 3:
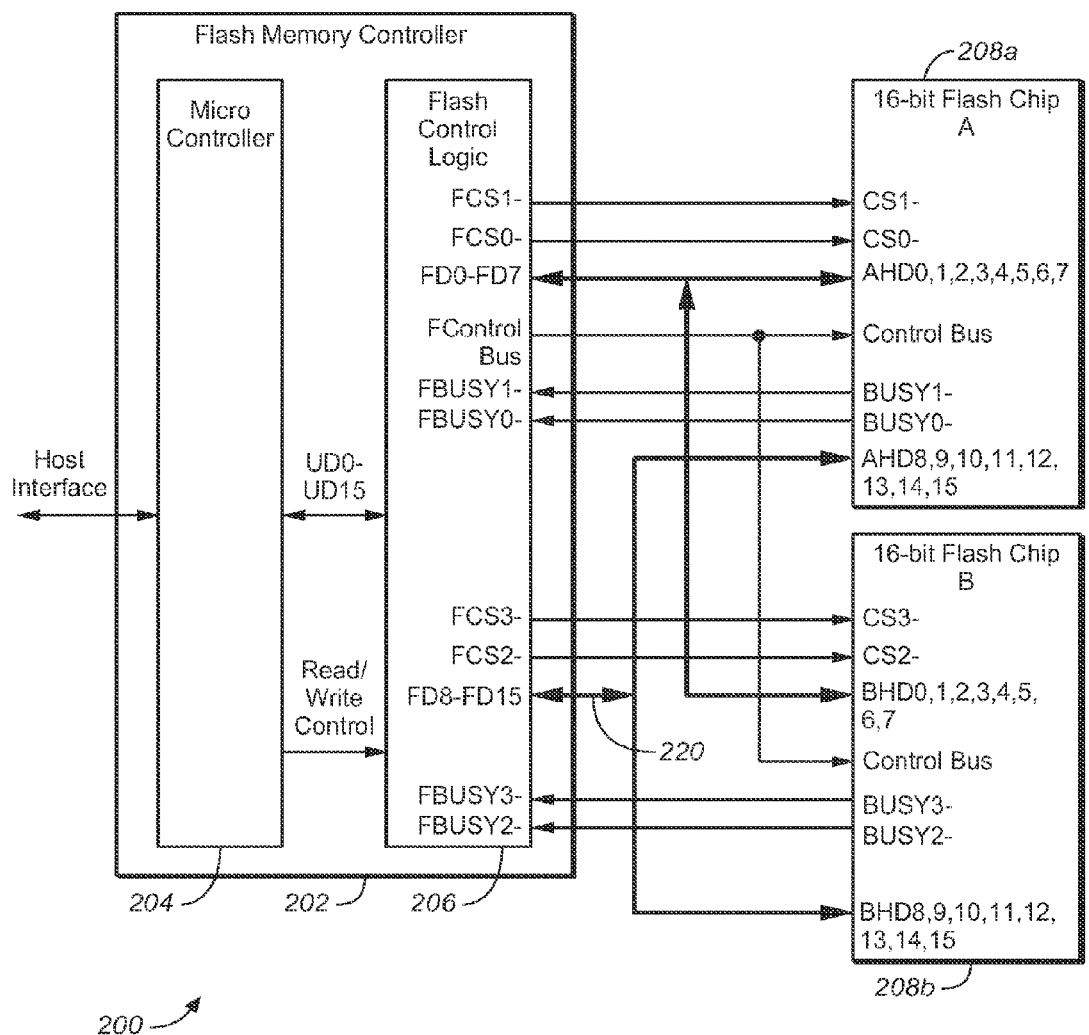
FIG. 3 is a circuit block diagram for a conventional 16-bit FLASH memory controller to support a single 16-bit access or two 16-bit interleave access FLASH memory chips.
Figure 4:
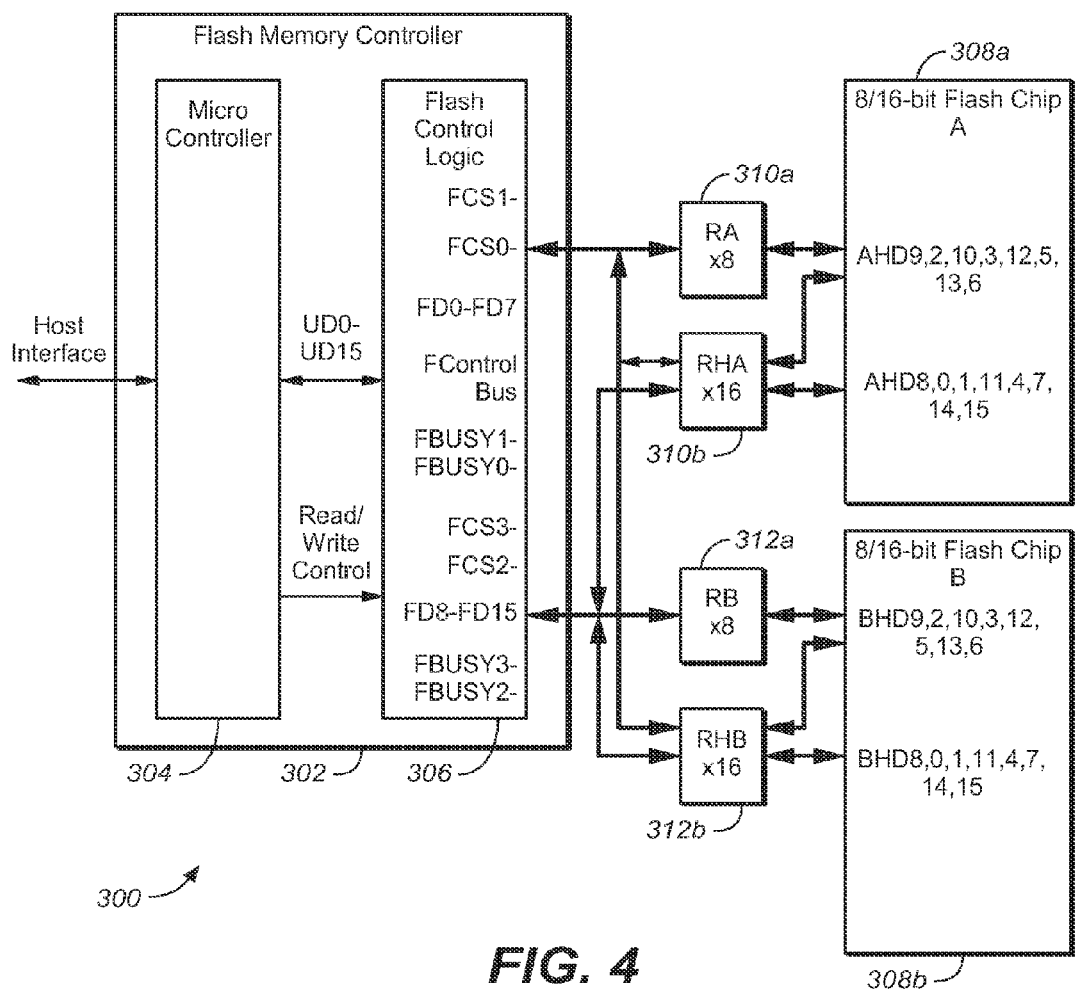
FIG. 4 is a circuit block diagram for a conventional 16-bit FLASH memory controller to support a single 8-bit access or two 8-bit parallel access or a single 16-bit access or two 16-bit interleave access FLASH memory chips on the same PCB.
Figure 5:
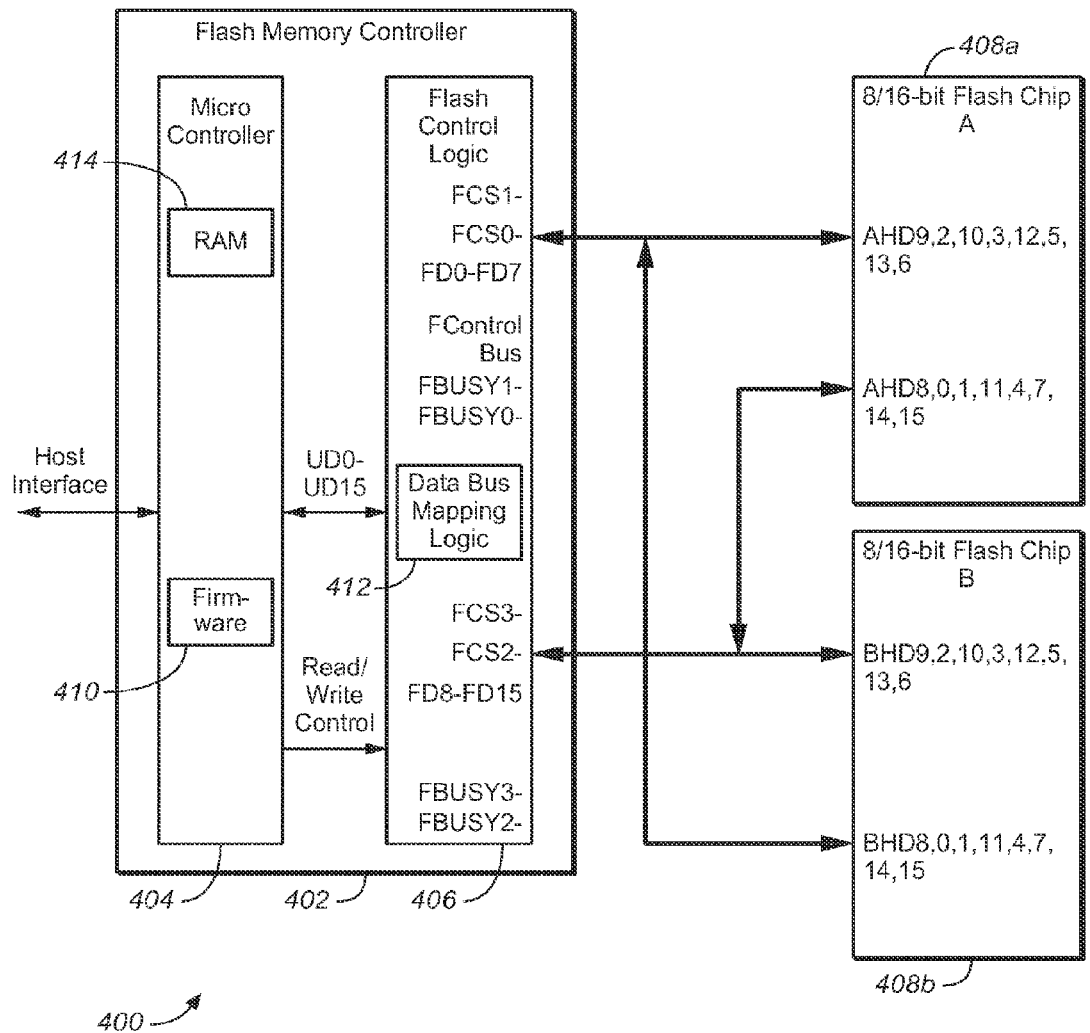
FIG. 5 is a simplified circuit block diagram for configurable data bus on FLASH memory controller interfacing with two 8/16-bit FLASH memory chips.

A method in accordance with the present invention supports both 8-bit and 16-bit FLASH memory chips and simplifies routing complexity by offering configurable data bus on FLASH Control Logic through firmware in the microcontroller and mapping logic in the FLASH controller logic. FIG. 5 is a simplified block diagram of a circuit 400 for a configurable data bus on a FLASH memory controller 402 interfacing with two 8/16-bit FLASH memory chips 408a and 408b. Routing traces are reduced from 96 down to 48, a 50% complexity reduction through the use of firmware 410 in the microntroller 404 and mapping logic 412 in the FLASH controller logic 406. The pin-out mapping and logic representation of circuitry are shown in Table 3 and Listing 2 respectively.

TABLE 3

Physical & Logical Mapping on FLASH memory controller and Memory Pinouts

| FLASH memory controller FD | FLASH Chip A Pinout | FLASH x8 Chip A AD | FLASH x16 Chip A AHD | FLASH Chip B Pinout | FLASH x8 Chip B BD | FLASH x16 Chip B BHD |
|---|---|---|---|---|---|---|
| 0  | 29 | 0 | 9  | 27 |   | 8  |
| 1  | 30 | 1 | 2  | 26 |   | 0  |
| 2  | 31 | 2 | 10 | 28 |   | 1  |
| 3  | 32 | 3 | 3  | 33 |   | 11 |
| 4  | 41 | 4 | 12 | 40 |   | 4  |
| 5  | 42 | 5 | 5  | 46 |   | 7  |
| 6  | 43 | 6 | 13 | 45 |   | 14 |
| 7  | 44 | 7 | 6  | 47 |   | 15 |
| 8  | 27 |   | 8  | 29 | 0 | 9  |
| 9  | 26 |   | 0  | 30 | 1 | 2  |
| 10 | 28 |   | 1  | 31 | 2 | 10 |
| 11 | 33 |   | 11 | 32 | 3 | 3  |
| 12 | 40 |   | 4  | 41 | 4 | 12 |
| 13 | 46 |   | 7  | 42 | 5 | 5  |
| 14 | 45 |   | 14 | 43 | 6 | 13 |
| 15 | 47 |   | 15 | 44 | 7 | 6  |

Listing 2 Logic Equations for One of the Possible Configurable Mappings (* is Logical AND operator. + is Logical OR Operator)

FD0=ChipA*(8 bit*UD0+16 bit*UD9)+ChipB*UD8

FD1=ChipA*(8 bit*UD1+16 bit*UD2)+ChipB*UD0

FD2=ChipA*(8 bit*UD2+16 bit*UD10)+ChipB*UD1

FD3=ChipA*(8 bit*UD3+16 bit*UD3)+
    ChipB*UD11=ChipA*UD3+ChipB*UD11

FD4=ChipA*(8 bit*UD4+16 bit*UD12)+ChipB*UD4

FD5=ChipA*(8 bit*UD5+16 bit*UD5)+
    ChipB*UD7=ChipA*UD5+ChipB*UD7

FD6=ChipA*(8 bit*UD6+16 bit*UD13)+
    ChipB*UD14

FD7=ChipA*(8 bit*UD7+16 bit*UD6)+ChipB*UD15

FD8=ChipA*UD8+ChipB*(8 bit*UD0+16 bit*UD9)

FD9=ChipA*UD0+ChipB*(8 bit*UD1+16 bit*UD2)

FD10=ChipA*UD1+ChipB*(8 bit*UD2+16
    bit*UD10)

FD11=ChipA*UD11+ChipB*(8 bit*UD3+16
    bit*UD3)=ChipA*UD11+ChipB*UD3

FD12=ChipA*UD4+ChipB*(8 bit*UD4+16
    bit*UD12)

FD13=ChipA*UD7+ChipB*(8 bit*UD5+
    16 bit*UD5)=ChipA*UD7+ChipB*UD5

FD14=ChipA*UD14+ChipB*(8 bit*UD6+16
    bit*UD13)

FD15=ChipA*UD15+ChipB*(8 bit*UD7+16
    bit*UD6)

Note that:
FD0 through FD15 are 16 corresponding logical data bus bits from FLASH Control Logic.
UD0 through UD15 are 16 corresponding logical data bus bits from micro-controller.
AD0 through AD7 are 8 corresponding logical data bus bits from 8-bit FLASH memory chip at physical location A.
AHD0 through AHD15 are 16 corresponding logical data bus bits from 16-bit FLASH memory chip at physical location A.
BD0 through BD7 are 8 corresponding logical data bus bits from 8-bit FLASH memory chip at physical location B.
BHD0 through BHD15 are 16 corresponding logical data bus bits from 16-bit FLASH memory chip at physical location B.
Chip A is a binary representation to select FLASH memory chip at physical location A.
Chip B is a binary representation to select FLASH memory chip at physical location B. Chip B is usually a logical inversion of Chip A.
8 bit is a binary representation to select 8-bit FLASH memory chip.
16 bit is a binary representation to select 16-bit FLASH memory chip. 16 bit is usually a logical inversion of 8 bit.

Figure 6:
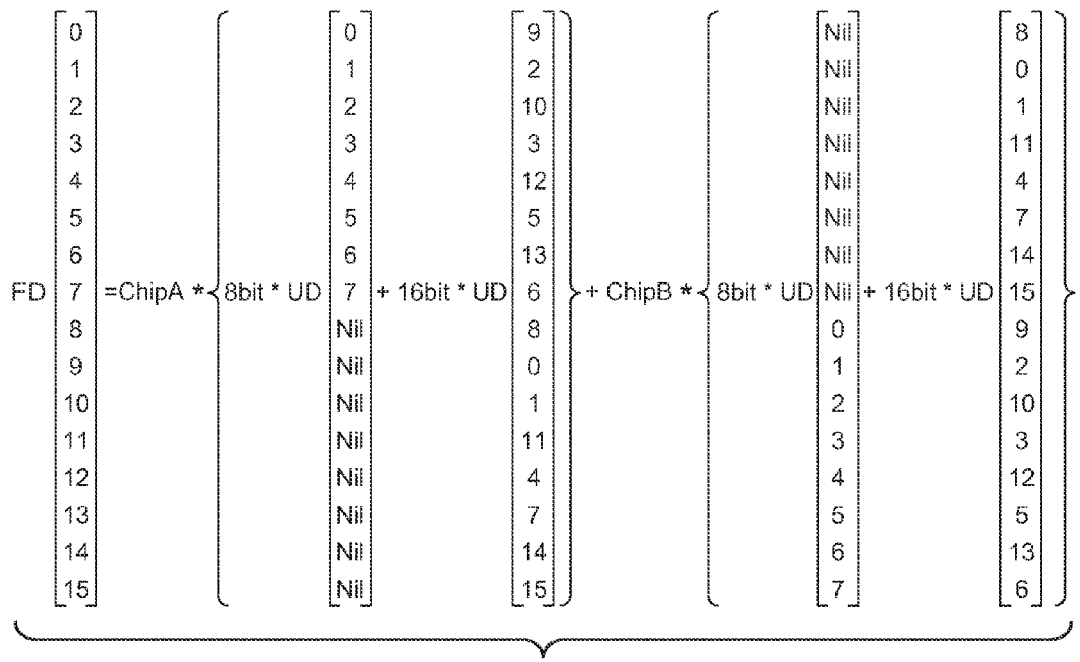
FIG. 6 is a generalized logic equation matrix transformation between micro-controller data bus and FLASH memory controller data bus.

The logic equations can be generalized and expressed as matrix transformation as shown in FIG. 6. There are five 1×16 matrices in the equations. The first matrix from left hand side defines 16-bit flash memory controller data bus. The second matrix defines corresponding 8-bit data bus on 8-bit FLASH memory chip at physical location A. Those unused bits are filled with Nil. The third matrix defines corresponding 16-bit data bus on 16-bit FLASH memory chip at physical location A. The fourth matrix defines corresponding 8-bit data bus on 8-bit FLASH memory chip at physical location B. Since these 8 bits data bus are connected to second-half of the FLASH memory controller's 16-bit data bus, the first-half of the matrix unused bits are filled with Nil. The fifth matrix defines corresponding 16-bit data bus on 16-bit FLASH memory chip at physical location B.

In general, the third and fifth matrix can be modified to accommodate different mappings among different FLASH memory technology. The values can be loaded by firmware 410 on the microcontroller 404. It literally changes the routing from hardware to software programming that dramatically reduces complexity. The firmware 410 then interacts with mapping logic 412 on the FLASH memory controller 402 to configure the data bus appropriately.

Figure 7:
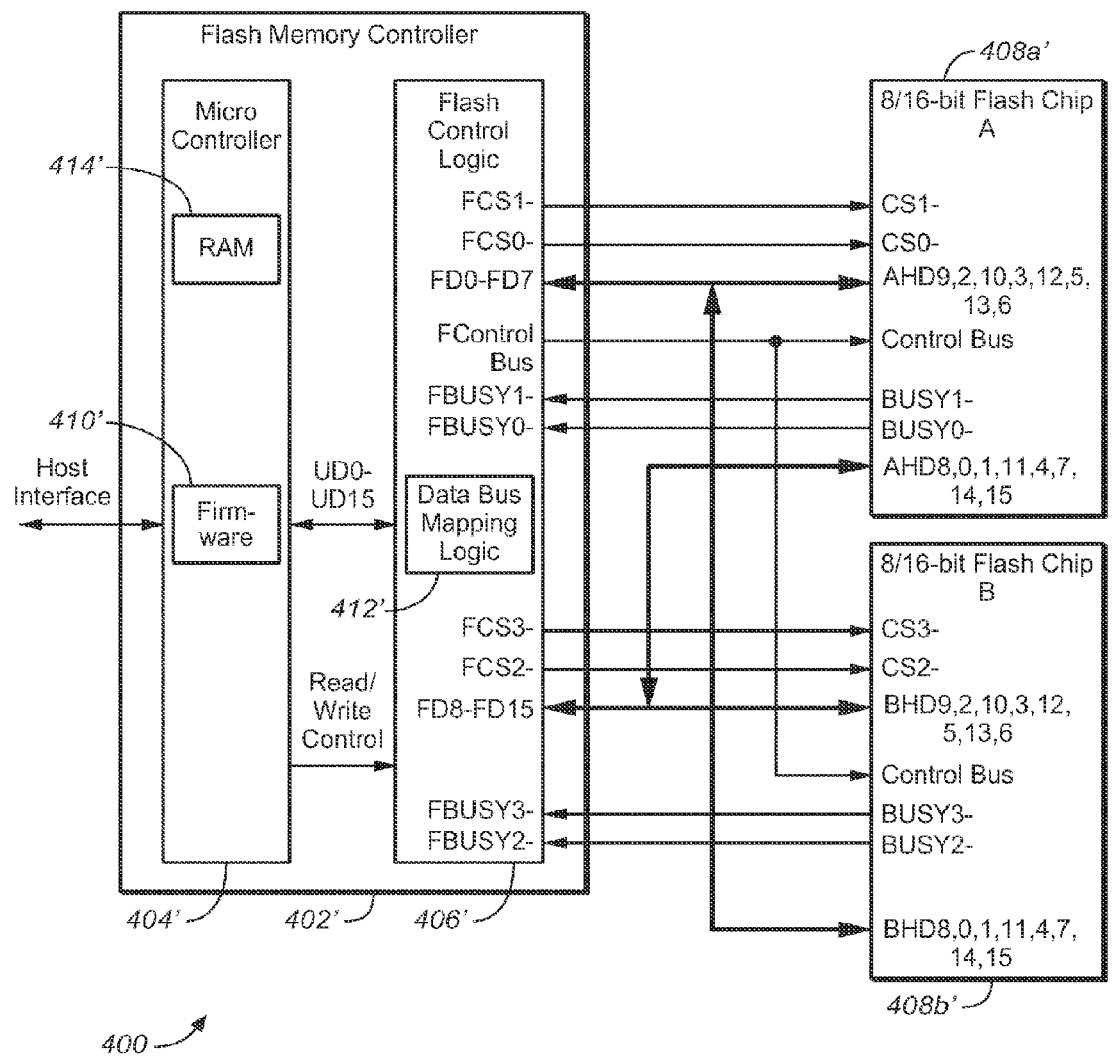
FIG. 7 is one possible mapping of circuit block diagram for configurable data bus on FLASH memory controller interfacing with two 8/16-bit FLASH memory chips.

FIG. 7 is one embodiment of a configurable data bus on a FLASH memory controller 402' interfacing with two 8/16-bit FLASH memory chips 408a' and 408b'. Note that FLASH data bus pins FD0 through FD7 are connected to AD0 through AD7, which are AHD 9, 2, 10, 3, 12, 5, 13, 6 respectively. FLASH data bus pins FD8 through FD15 are connected to BD0 through BD7, which are BHD 9, 2, 10, 3, 12, 5, 13, 6 respectively. This circuit diagram is one of the applications of the invention.

Figure 8:
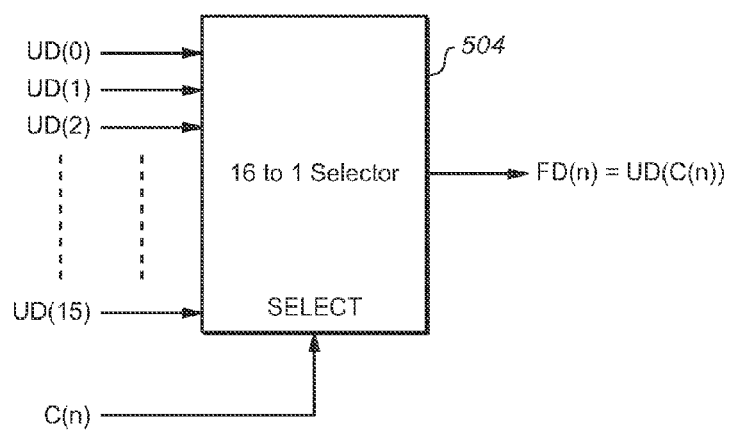
FIG. 8 is logic function implementation between FD (FLASH memory controller data bus) and UD (micro-controller data bus).
Figure 8A:
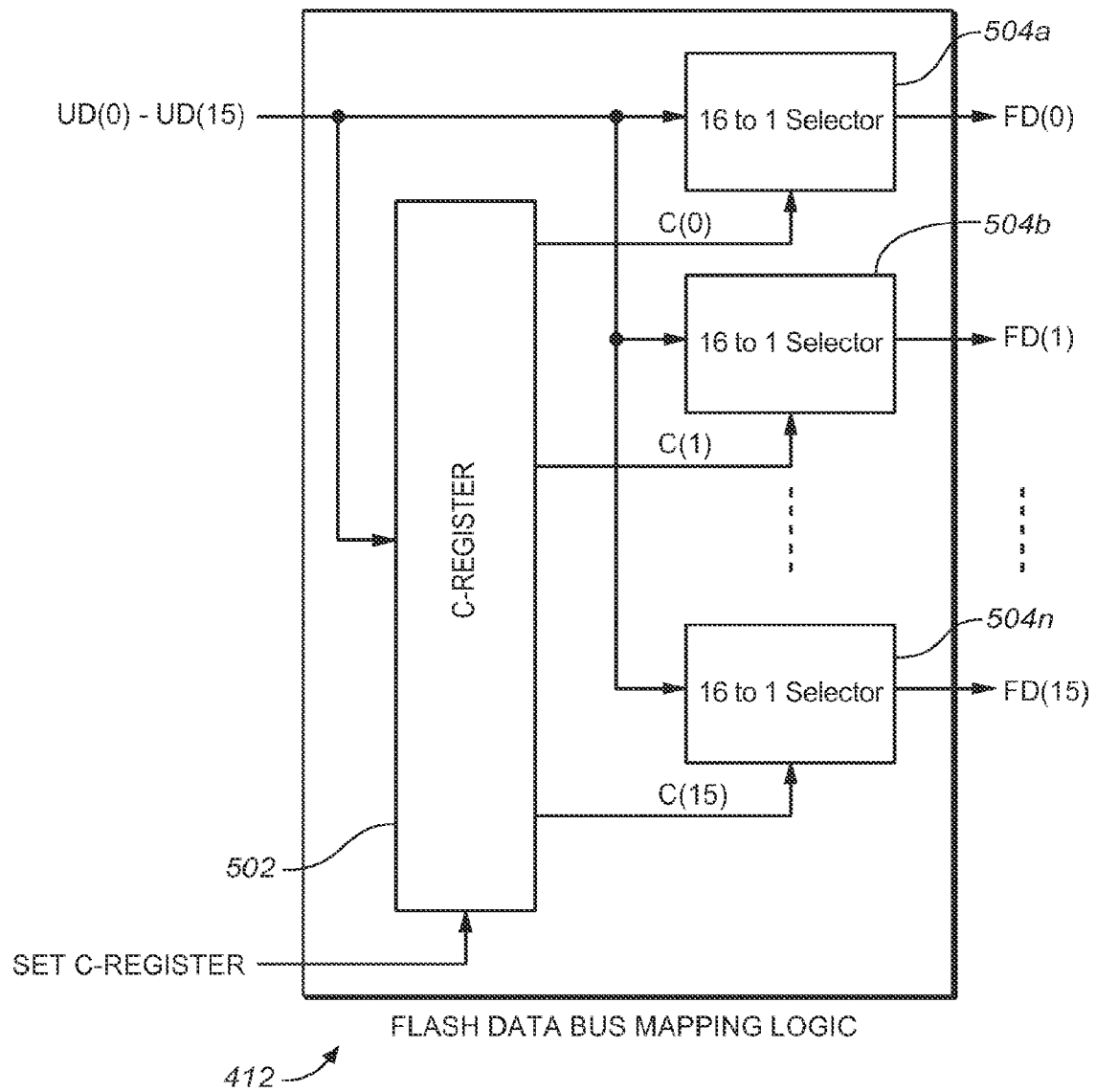
FIG. 8A is FLASH data bus mapper implementation.

The configurable mapping logic 412 is implemented with sixteen 16-to-1 selectors and a 16-bit configuration register C. FIG. 8 shows one such implementation of selector 504. Its function FD(n) is derived from function UD(C(n)), where C(n) is the n-th bit corresponding with configuration C-Register C 502. FIG. 8A shows a FLASH data bus mapper logic 412, where C-Register 502 is configurable. It uses FIG. 8 as a building block. Physical FLASH data bus FD(0) through FD(15) can be mapped to logical data bus UD(0) through UD(15) from micro controller 402 (FIG. 5).

Another feature of a system and method in accordance with the present invention is to offer flexibility of FLASH memory placement by configurable chip select (FCS) and control bus signals. A conventional FLASH memory controller has a very rigid chip select sequence and order. Therefore there is a significant constraint on how a FLASH memory chip is installed and how much the system can be expanded. The FLASH memory location, if not fully populated, should have the memory installed in a fixed order or sequence.

Figure 9:
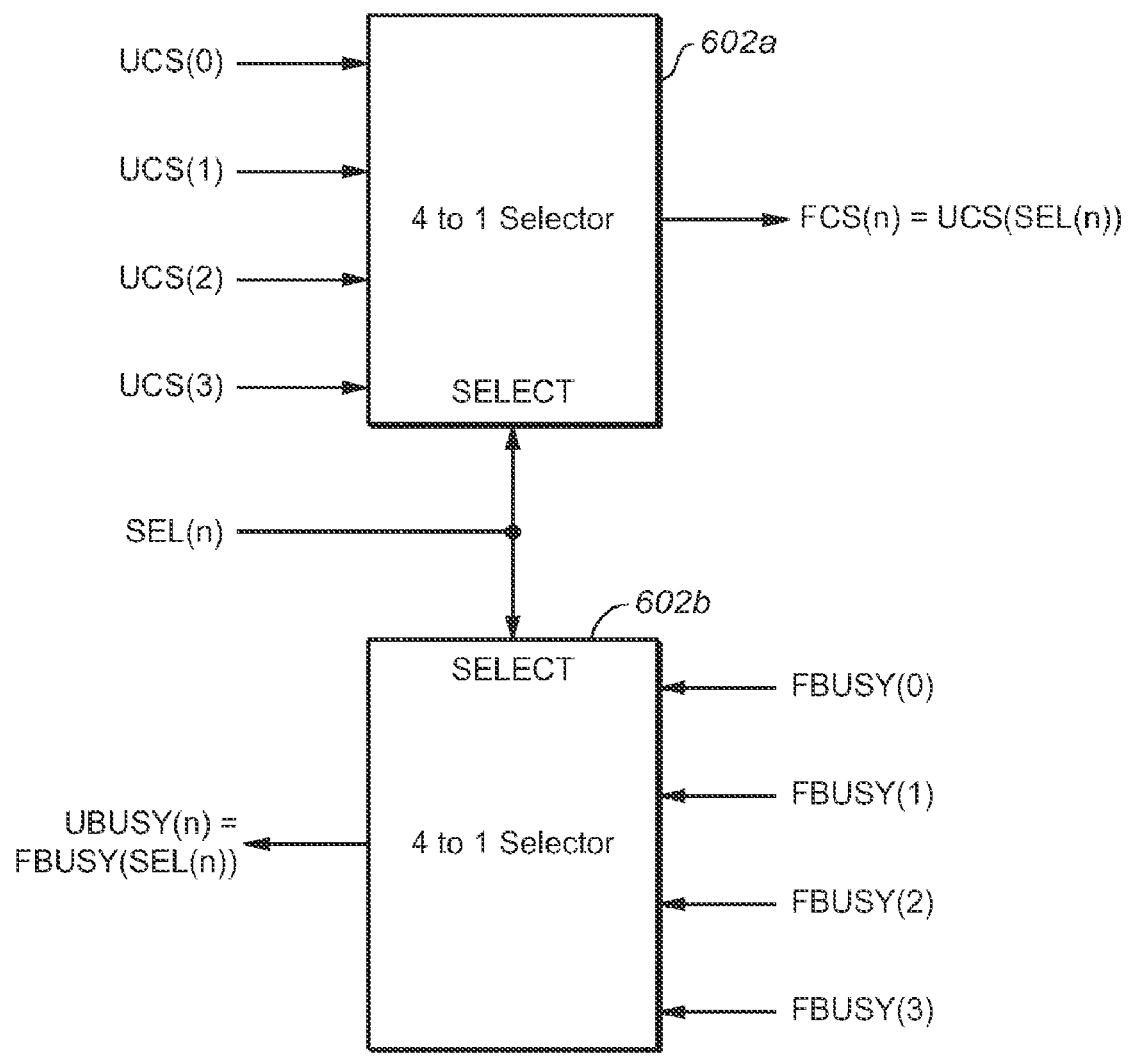
FIG. 9 is logic function implementation between FCS (FLASH chip select) bus and UCS (chip select) bus; as well as a logic function implementation between FBUSY (FLASH chip busy) status and UBUSY (logical chip busy) status.

In a preferred embodiment, a system and method in accordance with the present invention introduces four 4-to-1 selectors and a 4-bit select register SEL to allow for more configurability and for allowing for a more expanded and scalable system. FIG. 9 shows one such implementation of Chip Select bit n. Its function FCS(n) is derived from function UCS(SEL(n)), where SEL(n) is the n-th bit corresponding with configuration register SEL. UCS is the logical Chip Select register from micro-controller's perspective. Through this mapping, the physical installation order of FLASH memory chips can be of any sequence and combination. As long as the micro-controller 402 (FIG. 5) has a way to detect type and location of FLASH memory chip, the logical mapping can be done easily through firmware making bookkeeping and management of FLASH memory. Future expansion with any combination of FLASH memory chips becomes a simple reality. A similar mapping selector 600 for FBUSY bus and BUSY bus can be implemented in the same way as in FIG. 9.

Figure 9A:
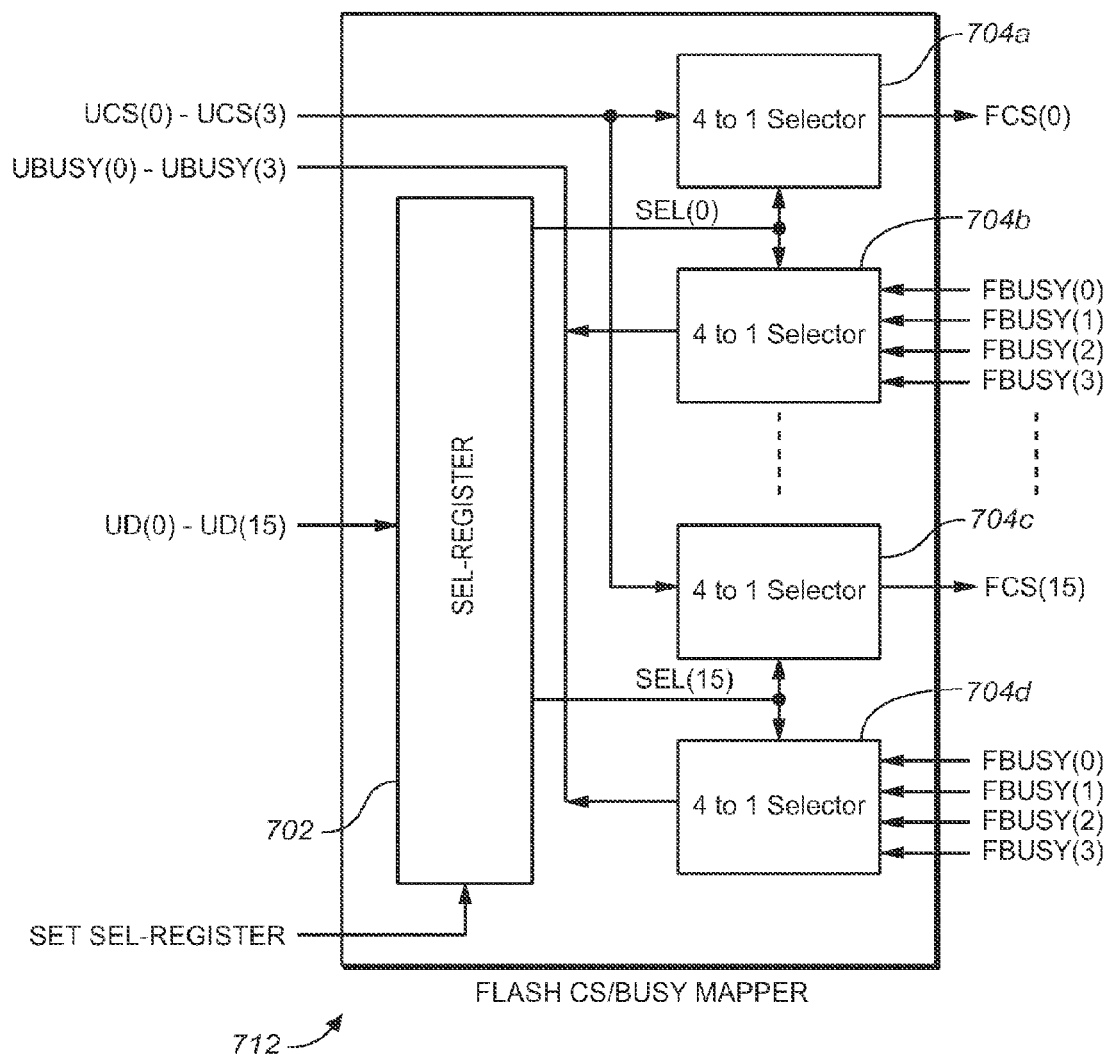
FIG. 9A is FLASH CS/BUSY mapper implementation.

FIG. 9A is a flash CS/BUSY mapper implementation 712, where SEL-Register 702 is configurable. It uses FIG. 9 as a building block. Physical chip select signals FCS(0) through FCS(3) can be mapped to logical chip select signals UCS(0) through UCS(3) from microcontroller. Similarly, physical chip busy status FBUSY(0) through FBUSY(3) can be mapped to logical chip busy status UBUSY(0) through UBUSY(3) from microcontroller.

Figure 10:
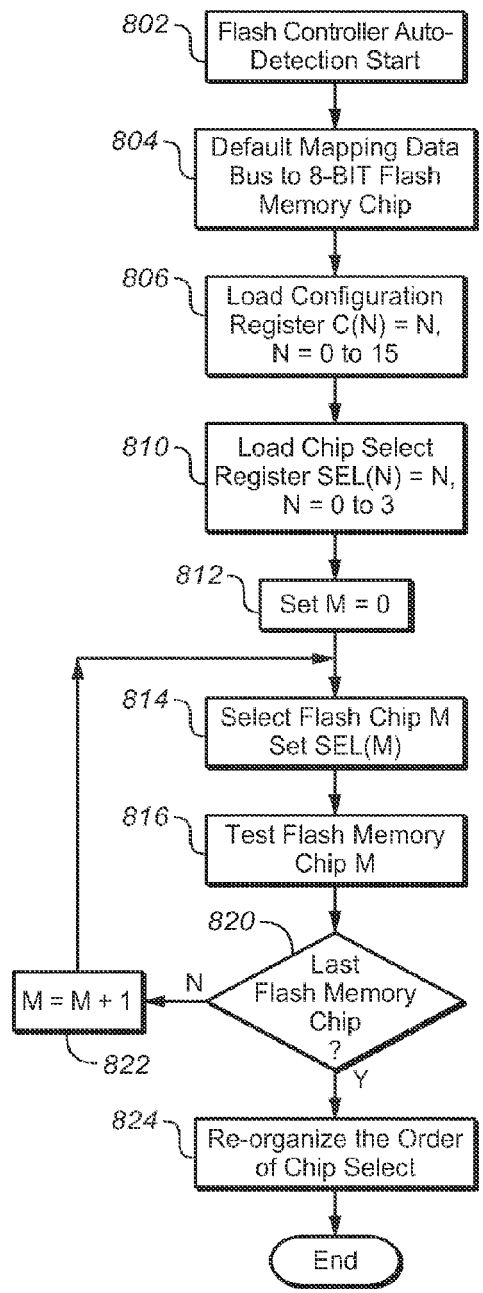
FIG. 10 is a flow chart for FLASH memory controller to auto-detect the type of FLASH memory and configuration.

FIG. 10 is a flow chart for a FLASH memory controller to auto-detect the type of FLASH memory and its configuration. During the auto-detection process, mapping logic first configures the FLASH control logic to work with 8-bit FLASH memory. The corresponding value is loaded into configuration register C. The corresponding chip select register is also loaded with default value. Each physical location is tested one by one through setting selection register SEL.

First, FLASH controller auto-detection is started, via step 802. Next, a Flash Data Bus is mapped to the default 8-bit FLASH memory chip, via step 804. Then, the configuration register is loaded C(N)=N, N=0 to 15, via step 806. Then, the chip select register is loaded SEL(N)=N, N=0 to 3, via step 810. Thereafter set M=0, via step 812. Next FLASH chip M is selected, Set SEL(M), via step 814. Then, test FLASH memory chip M, via step 816. Check if this is the last FLASH memory step? via step 820. If no, M=M+1, via step 822 and return to step 814. If yes, re-organize the order of chip select, via step 824.

Figure 11:
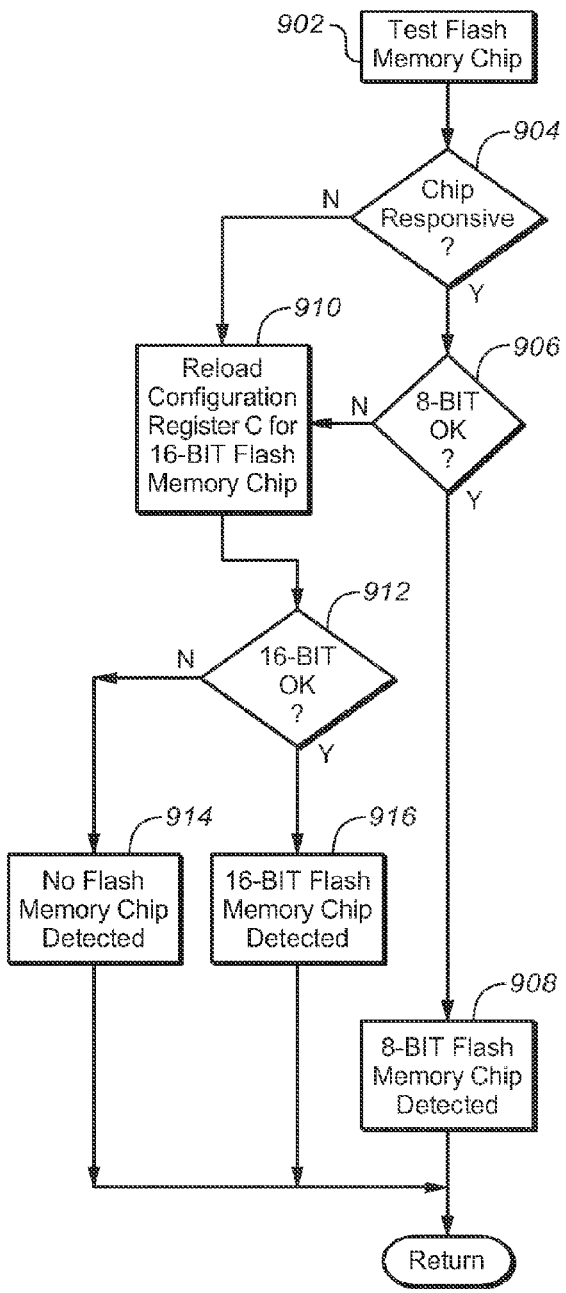
FIG. 11 is a flow chart for FLASH memory controller to test and detect the type of FLASH memory.

FIG. 11 is a flow chart for FLASH memory controller to test and detect the type of FLASH memory. In this embodiment, the micro-controller first tests if FLASH memory chip is responsive, via steps 902 and 904. If so, 8-bit protocol is used to further test FLASH memory chip 906. If the result is OK, 8-bit FLASH memory chip is detected, via step 908. Otherwise, either if FLASH memory is not responsive or 8-bit test fails, micro-controller firmware will reload configuration register C for a 16-bit FLASH memory chip, via step 910. 16-bit protocol is then used to test FLASH memory chip. If the result is OK, via step 912, 16-bit FLASH memory chip is detected, via step 916. If it fails, no FLASH memory chip is detected at this physical location via step 914. In any case, the Chip Select and FLASH type and/or status are recorded and the process returns to test the next physical location, until all locations are visited.

After all physical locations are tested, the micro-controller has detected the FLASH memory type and density configuration. It may re-organize the order of chip select signals for easier programming in the firmware.

Although a system and method has been described utilizing 16-bit FLASH memory controller and 8-bit and 16-bit FLASH memory chips, its architecture is scalable for higher data bus bandwidth support on either FLASH memory controller or FLASH memory chip. Generalized matrix transformation as shown in FIG. 6 scales to 32-bit data bus and beyond.

A method and system in accordance with the present invention provides the following advantages:

a. Configurable data bus on FLASH memory controller through software to simplify routing complexity.
  i. Routing traces are reduced from 96 down to 48, a 50% complexity reduction.
b. Configurable chip select and control bus for flexibility of FLASH memory placement.
c. Eliminating external resistor network for layout simplicity.
d. Scalable architecture for higher data bus bandwidth support.
  i. Scalable to 32-bit FLASH memory controller, or FLASH memory chip with no external hardware component.
e. Auto-detection of FLASH memory type and capacity configuration.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A FLASH memory controller comprising:
   a microcontroller; the microcontroller including firmware for providing different mappings for different types of FLASH memory chips;
   FLASH control logic for communicating with the microcontroller and adapted to communicate via a FLASH data bus to at least one FLASH memory chip; the FLASH control logic including configurable mapping logic which is in communication with the firmware, the mapping logic comprising a plurality of 4-to-1 selectors and a 4-bit configuration register SEL to allow for more configurability and for allowing for a more expanded and scalable system; the mapping logic for configuring the FLASH data bus based upon the firmware providing information concerning the type of FLASH memory chip coupled thereto; wherein each of the selectors corresponds to a particular value corresponding to a particular type of FLASH memory chip; wherein at least one of the values are stored in the configuration register if the FLASH memory is coupled thereto; and a FLASH mapping selector unit wherein the mapping logic maps physical chip select (CS) signals to logical chip select (CS) signals.

2. The controller of claim 1 wherein the values for the mappings can be loaded on demand.

3. The controller of claim 1 wherein the at least one configuration register is configurable.

4. The controller of claim 1 wherein the FLASH data bus is mapped to a logical data bus.

5. The controller of claim 1 wherein the memory controller detects the FLASH memory chips attached thereto and the memory chips configuration.

6. The controller of claim 5 wherein during detection the mapping logic first configures the FLASH control logic to operate with a default FLASH memory chip.

7. The controller of claim 6 wherein the default FLASH memory chip comprises an 8-bit FLASH memory chip.

8. The controller of claim 7 wherein the corresponding values for the 8-bit FLASH memory chip is loaded into at least one configuration register and each physical location is tested through a selection.

9. In a Flash controller a method for detecting the type of Flash memory chip being utilized with a Flash memory controller, the Flash memory controller including a microcontroller and Flash control logic coupled to the microcontroller, the method comprising:

mapping a data bus of the Flash controller utilizing mapping logic comprising a plurality of 4-to-1 selectors within the Flash control logic to a default Flash memory chip wherein the value is loaded into a 4-bit configuration register SEL and by loading a default value into a the 4-bit configuration register SEL to allow for more configurability and for allowing for a more expanded and scalable system; and determining if the Flash memory chip is responsive based upon the mapping;

detecting if the mapping is correct if the chip is responsive utilizing firmware in a memory controller;

determining if the Flash memory chip is other than the default memory chip if the mapping is not correct by reloading the configuration register with another value; and mapping physical chip select (CS) signals to logical chip select (CS) signals with a FLASH mapping selector unit.

10. The method of claim 9 wherein if the mapping is not correct, the configuration register is reloaded with another type of Flash memory chip.

11. The method of claim 9 wherein the default memory chip is an eight (8) bit memory chip.

* * * * *